United States Patent
DeFrancesco et al.

(10) Patent No.: US 8,380,547 B2
(45) Date of Patent: Feb. 19, 2013

(54) SYSTEM AND METHOD FOR COMPLAINT TRACKING, IMAGING AND PROCESSING

(75) Inventors: Patsy A. DeFrancesco, Wethersfield, CT (US); Bruce S. Henderson, Colchester, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 0 days.

(21) Appl. No.: 13/437,358

(22) Filed: Apr. 2, 2012

(65) Prior Publication Data

US 2012/0191486 A1     Jul. 26, 2012

Related U.S. Application Data

(62) Division of application No. 12/399,586, filed on Mar. 6, 2009, now Pat. No. 8,195,485.

(51) Int. Cl.
*G06Q 40/00* (2012.01)
(52) U.S. Cl. ............................................. 705/4; 705/35
(58) Field of Classification Search ................. 705/4, 35
See application file for complete search history.

(56) References Cited

U.S. PATENT DOCUMENTS

| | | | |
|---|---|---|---|
| 2003/0202643 A1* | 10/2003 | Joseph et al. | 379/88.18 |
| 2005/0086179 A1* | 4/2005 | Mehmet | 705/80 |
| 2011/0295623 A1* | 12/2011 | Behringer et al. | 705/4 |

OTHER PUBLICATIONS

Making service a competitive weapon Anonymous. Insurance & Technology. New York: Jun. 2003.*
A Model for Customer Complaint Management Author(s): Claes Fornell and Birger WernerfeltReviewed work(s):Source: Marketing Science, vol. 7, No. 3 (Summer, 1988).*

* cited by examiner

*Primary Examiner* — William Rankins
(74) *Attorney, Agent, or Firm* — McCormick, Paulding & Huber LLP (57) ABSTRACT

The present invention relates to an insurance complaint document management and processing system that interfaces with a state Department of Insurance. According to some embodiments, an insurance complaint document is received at a document conversion system. The received document may be converted to a document image may be automatically matched to insurance policy information. It may then be arranged to provide the document image and the insurance policy information for resolution.

20 Claims, 10 Drawing Sheets

SYSTEM AND METHOD FOR COMPLAINT TRACKING, IMAGING AND PROCESSING

CROSS REFERENCE TO RELATED APPLICATION

This application is a Divisional Application of prior application Ser. No. 12/399,586, filed on Mar. 6, 2009, and published as U.S. Patent Application Publication No. 2010/0228581, the entire contents of which are incorporated herein by reference.

BACKGROUND OF THE INVENTION

Highly regulated industries like financial services and insurance are accountable to various state agencies and departments. In the insurance industry, State Department of Insurance offices require that an insurance company track and manage complaints related to the services and products the insurance company offers. Some examples of these complaints include: improper denial or delay in settlement of a claim; non-receipt of documents such as policies; alleged illegal cancellation or termination of an insurance policy; alleged misrepresentation by an agent, broker, or solicitor; alleged theft of premiums paid to an agent, broker, or solicitor and other problems concerning insurance premiums, renewals and rates, etc. An insurance company might receive many thousands and even millions of complaints in a single year. These complaints may be received in a variety of ways and formats such as via a local Department of Insurance, through agents' systems, or directly via postal mail, facsimile machines, and email. Moreover, the insurance company will typically receive many different types of documents and supporting materials such as bills, accident reports, policies, renewal cards and claim forms and those documents will be received from various types of parties e.g., claimants, agents, and other insurance companies.

For each complaint filed, the insurance company needs to track and manage the complaint from complaint initiation to final resolution. Generally, the complaint will need to be validated with an appropriate insurance policy. Moreover, various documents associated with the complaint may need to be collected together in order to be processed in an orderly fashion. Such actions can be time consuming, error prone, and difficult to administer on a cost effective basis, especially when a substantial numbers of documents and insurance claim complaints are involved. Finally, the resolution progress and outcome of each and every complaint needs to be tracked and reported. These requirements place a large administrative and financial burden on the insurance companies.

SUMMARY OF THE INVENTION

The present invention is an insurance complaint document processing, imaging, management and administration system. In some embodiments, the present invention is an insurance complaint document processing system adapted for communication with a Department of Insurance including a communication device to receive and transmit complaint documents via a communication network; a processor coupled to the communication device for processing complaint related information; and a storage device in communication with said processor and storing instructions adapted to be executed by said processor to process an insurance complaint document into an electronic image format; store the insurance complaint document electronic image; validate the complaint document with an insurance policy identifier; resolve complaint document redundancies associated with at least one insurance policy identifier into a consolidated complaint record; process the consolidated complaint record for resolution; and transmit complaint resolution progress information to the Department of Insurance via the communication device.

In other embodiments, the present invention is an integrated insurance complaint document management and processing system for managing and processing Department of Insurance complaints, including a complaint document conversion sub-system to: (i) receive an insurance complaint document from a remote device, (ii) convert the received insurance complaint document to a document image, (iii) assign document identification data to the document image and (iv) store the document identification data; an automated validation sub-system to: (i) receive the document image and document identification data from the document conversion system, and (ii) match the document image with insurance policy information from an insurance policy database; and a complaint redundancy sub-system to: (i) receive the insurance policy information associated with the document image from the automated validation engine, (ii) resolve for redundancies related to the insurance policy and (iii) consolidate redundancies related to the insurance policy.

In further embodiments, the present invention is a computer-readable medium storing instructions adapted to be executed by a processor to perform an insurance complaint document processing method in a complaint document system, said method including receiving an insurance complaint document image and associated document identification data from a document conversion sub-system via a communication device; validating the document identification data with indicia indicative of a insurance policy in a policy validation sub-system; resolving redundancies between two or more complaint document images and the insurance policy in a redundancy review sub-system; transmitting an indication of the insurance complaint document image along with the indicia indicative of the insurance policy to a state Department of Insurance in a complaint resolution sub-system; and displaying the insurance complaint document image on a terminal device in the complaint resolution sub-system.

A technical effect of the invention is an automated facilitation of insurance complaint document imaging, processing and tracking without burdensome complaint redundancy. With this and other advantages and features that will become hereinafter apparent, a more complete understanding of the nature of the invention can be obtained by referring to the following detailed description and to the drawings appended hereto.

DETAILED DESCRIPTION OF THE PREFERRED EMBODIMENTS

Figure 1:
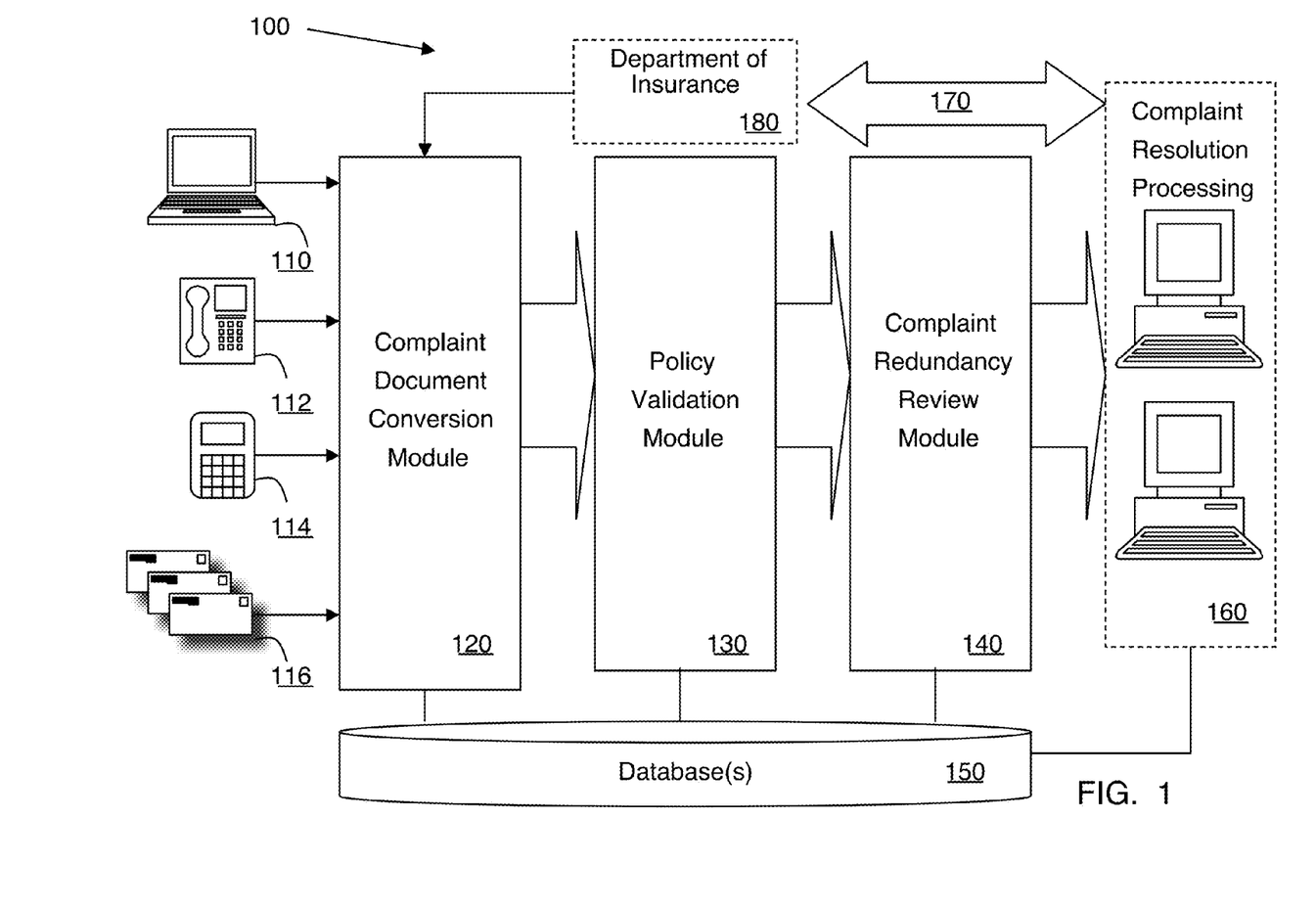
FIG. 1 is a block diagram of a system according to some embodiments of the present invention.

FIG. 1 is a block diagram of an insurance complaint document management, tracking and processing system 100 according to some embodiments of the present invention. The system 100 facilitates the management, tracking and processing of insurance related complaint documents that are received from a variety of sources and data feeds. As used herein, the phrase "insurance complaint document" may refer to, for example, electronic, verbal or physical representations of information and data associated with a complaint or dispute related to an insurance policy, event, or claim. By way of further example, an insurance complaint document might be an actual state Department of Insurance or DOI complaint form either in a paper or electronic medium, an electronic mail message directly from an insurance company policyholder or claimant, a voicemail from one or more third parties, or a supporting piece of documentation related to the complaint such as a law enforcement related document (e.g., a police accident report or speeding ticket), a billing document (e.g., from medical service provider or a repair shop), a legal proceeding document (e.g., associated with a civil, criminal, or arbitration proceeding), or an insurance policy document (e.g., from another insurance company). Additionally note that the word "document" as used herein can refer to other types of information, including photographs, video images, and/or audio recordings associated with an insurance event or claim. System 100 may be employed by one or more insurance companies or by one or more third party administrators for management, tracking and processing complaints of one or more other insurance companies.

Moreover, as used herein the term "submitter" may refer to any person or entity that provides insurance complaint documents or participates in the input and processing of documents to the system 100. By way of example only, a submitter could be a representative from a Department of Insurance office, a State Attorney General, a local or national business association such as the Better Business Bureau, a federal regulatory agency such as the SEC or FCC, an individual insurance claimant, an attorney or law firm, a broker or agent, a third party service provider, or an insurance company employee or contractor.

Referring still to FIG. 1, one or more submitters might send, provide or deliver insurance complaint documents from one or more remote devices 110, 112, and 114 via a communication network. The devices could comprise, for example, handheld electronic devices, telephones, facsimile machines, email servers, and/or web servers. Note that any of the devices described herein might comprise a Personal Computer (PC), a portable computing device such as a Personal Digital Assistant (PDA), or any other appropriate storage and/or communication device to exchange insurance-related information via a web site and/or a communication network. As used herein, devices may exchange information via any communication network, such as a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

According to some embodiments, submitters might also send insurance complaint documents 116 to the system via postal mail or any other document delivery system. For example, all mail addressed to a particular Post Office box might be delivered to, and be handled by, the system 100. Also note that the system 100 may receive documents in bulk from one or more submitters. For example, a received document packet might represent an envelope that contained a number of separate pages or "sub-documents" which may individually represent individual complaints or complaint related documentation.

According to some embodiments, the insurance complaint documents provided by submitters and/or the remote devices is received by or at a complaint document conversion module 120. The complaint document conversion system 120 may, for example, convert each received document into a specified document image format (e.g., an electronic file representing the insurance complaint document). The document conversion system 120 may also assign complaint document or correspondence identification data to the document image. For example, the document conversion system 120 might assign a unique identifier, such as an alphanumerical based indicia related to certain complaint identifying indicia such as a source of the complaint (individual, government entity or agency, etc.), a claimant name, an address, and/or date of loss to the document image. The unique identifier may also identify a specific insurance company for use by a third party administrator to segregate different insurance companies complaints.

The document conversion system 120 may provide the complaint document image and assigned document correspondence identification data to an automated policy validation module 130. Note that some or all of the elements described with respect to the present invention might be "automated." As used herein, the term "automated" indicates that at least some part of a step associated with a process or service is performed with little or no human intervention. The automated policy validation module 130 might, for example, match the document image with insurance information such as by validating the image with an appropriate insurance policy number, insurance event number, and/or insurance claim number which may be resident in database 150 or from one or more internal and/or external data sources. Policy validation is critical in the complaint management process so that complaint resolution can be associated with the appropriate policy claim at issue According to some embodiments, the automated policy validation engine 130 provides the document image and associated insurance information to an automated complaint redundancy review module 140. As used herein, the term "redundant complaint" refers to two or more complaints which are associated with the same insurance policy and/or policy claim. It is contemplated that one or more submitters may provide the same or similar complaints across a variety of mediums, formats and submission venues, such as submission to two or more distinct State Department of Insurance offices. Similarly, a single complainant may submit the same complaint via postal mail as well as via email.

The complaint redundancy module 140 may, for example, resolve redundancies in the various complaint documents, such as by consolidating redundant complaints that may have been made and thereby greatly reducing the administrative and resource burden on insurance companies and Departments of Insurance. This may be accomplished by a review of the document image, the insurance information, and/or the document identification data and comparing this information with one or more other document images to resolve redundancies. Redundant complaints can result in duplicative and inefficient processing of the complaints to resolution. For example, if two redundant complaints are resolved independently of one another, the result may be two different resolutions affecting the same policyholder. Furthermore, supporting documentation in one redundant complaint may be able to assist resolution in another related redundant complaint. Once multiple redundant complaints are identified, a single complaint record or file may be created which is associated with a single insurance policy or claim with the insurance company.

Note that complaint document conversion system 120, automated policy validation engine 130, redundancy review system 140, and/or any of the other devices described herein might communicate directly such as via a network communication system, via an email message attachment or a file transfer or through one or more database(s) 150. For example, the complaint document conversion system 120 might store an image file (or a link or pointer to the image file) in database(s) 150. The automated policy validation engine 130 and/or redundancy review system 140 could then access the image file via database(s) 150. Database(s) 150 may also store related policyholder information, historical complaint document information and other insurance related information as needed by complaint document conversion system 120, automated policy validation engine 130, and redundancy review system 140.

According to some embodiments, complaint document conversion system 120, automated policy validation engine 130 and redundancy review system 140 may be coupled to a complaint processing module 160 which may include one or more local or remote claim processor devices 162. For example, an employee of an insurance company might review the complaint file and associated insurance information (e.g., from the databases 150) when handling one or more of the complaint file for resolution. For example, embodiments may be used to process and resolve complaints related to new or existing insurance claims, such as claims under auto, life, property, group benefits, surplus, commercial or workers compensation policies.

Complaint processing module 160 is in communication via communications link 170 with one or more department of insurance entities 180. As discussed earlier, it is contemplated that one or more submitters might send, provide or deliver insurance complaint documents via or through the Department of Insurance directly. Communications with the Department of Insurance 180 may include transmissions of original complaints, complaint progress and/or resolution information. Those skilled in the art will recognize that features described in the illustrative example may be used to desirable advantage in other complaint management and processing situations.

Although a single complaint document conversion system 120, policy validation engine 130, and complaint redundancy review system 140 are shown in FIG. 1, any number of such systems may be included. Similarly, any number of submitter devices and claim processor devices (and any other devices described herein) may be included and/or combined according to embodiments of the present invention. For example, in some embodiments, the complaint document conversion system 120 and automated policy validation engine 130 might be co-located and/or may comprise a single apparatus or subsystem.

Figure 2:
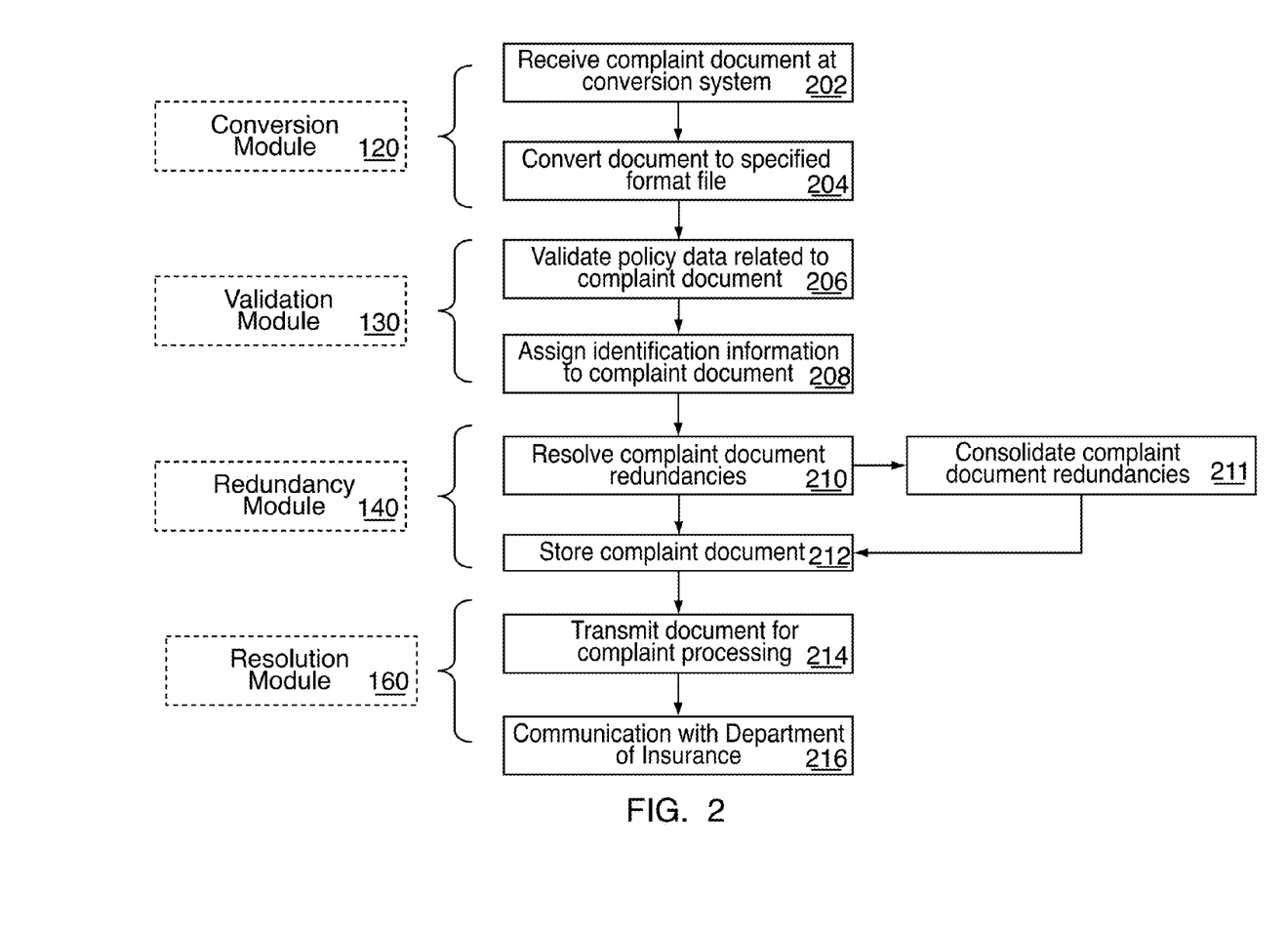
FIG. 2 illustrates a method according to some embodiments of the present invention.

FIG. 2 illustrates a method that might be performed, for example, by some or all of the elements of the system 100 described with respect to FIG. 1 according to some embodiments. The flow charts described herein do not imply a fixed order to the steps, and embodiments of the present invention may be practiced in any order that is practicable. Note that any of the methods described herein may be performed by hardware, software, or any combination of these approaches. For example, a storage medium may store thereon instructions that when executed by a machine result in performance according to any of the embodiments described herein.

At 202, an insurance complaint document is received at a complaint document conversion system. For example, the document conversion system might receive thousands of insurance complaint documents from various submitters and sources each day. As described earlier, the complaint document may be an actual document alleging a complaint or the complaint document may be one of a variety of supporting complaint documents. One example of such a document conversion system is described herein with respect to FIG. 4 later herein.

At 204, the received complaint document is converted into a specified complaint document image file format. For example, an automated application at the document conversion system might translate received facsimile based signals into an electronic image file. In some cases, paper documents might be scanned and converted via an optical character recognition process into image files with text recognition. Electronic submissions may be processed to convert the complaint submission into a specified format for storage in one or more databases.

At 206, the document identification data is validated with existing insurance information, such as a policy or claim number. Consider, for example, an insurance company that has issued a large number of insurance policies, and at least some of those insurance polices are associated with insurance claims and/or complaints. In this case, an automated computer-implemented complaint validation module might map a set of document identification data to an appropriate insurance claim or policy identifier. Moreover, this mapping might be performed by applying the set of data to a pre-determined rule, formula, and/or a weight (e.g., one type of data might be considered a more likely indicator of an accurate claim or policy number as compared to other types of data and thus be "weighed" more heavily by the automated validation engine). Note that the insurance information might be temporarily or permanently stored (e.g., in connection with the document identification data and/or the document image).

At 208, policy identification data is assigned to the complaint document image. The policy identification data may be an alphanumerical identifier and include identifying indicia such as a claim number, a claimant name, address, and/or contact information. Other examples of policy identification data might include a date of complaint, a date of loss or accident, a date of service, a claim type, and/or a geographic location (e.g., a state where an insurance policy was issued or where an insurance claim arose). The assignment of policy identification data might be performed, for example, manually via a graphical user interface and/or using an optical character recognition process.

At 210, complaint redundancies are resolved. For example, an each individual complaint may be cross-referenced with an aggregate set of historical complaint document to determine if one or more redundancies exist. If redundancies are found, the complaint documents are consolidated at 211.

At 212, complaint documents are stored in an electronic repository such as in one or more local or remote database(s), such as database 150 as described in FIG. 1.

At 214, complaint documents are transmitted to one or more complaint resolution processors such as described with respect to FIG. 1. Complaint processors act to resolve the complaint in one or more manners in accordance with the circumstances of the policy underlying the complaint and appropriate regulatory guidelines.

At 216, complaint progress and/or resolution are communicated to the appropriate Department of Insurance. Based on the circumstances of a complaint, resolution may take a variety of forms and actions. For example, in a complaint alleging non-receipt of documents such as policies, the insurance company may provide the missing documents to the policyholder and the complaint will be deemed to be resolved. By way of another example, in a complaint alleging premature termination of an insurance policy, the insurance may investigate and determine that the policy was properly terminated and thus the complaint is resolved.

Figure 3:
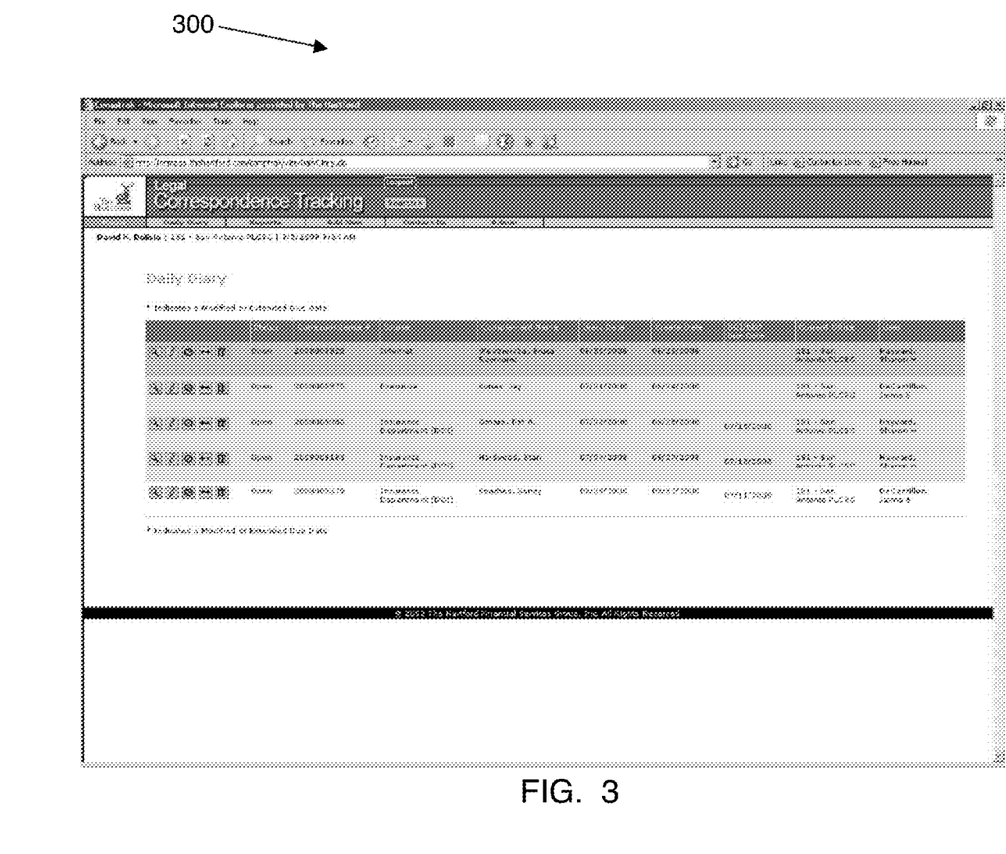
FIG. 3 illustrates a system display in accordance with some embodiments of the invention.

FIG. 3 illustrates an exemplary graphical user interface display in accordance with an exemplary embodiment of the present invention. In particular, FIG. 3 illustrates a display 300 that might be used, for example, to access complaint document images and/or information about one or more complaints. The display 300 includes a list of complaint documents that have been received and displays information such as status, document identification number/correspondence number, source, date, office, etc. A user of the system may, according to some embodiments, adjust and/or enter additional information about each of the entries in display 300.

Figure 4:
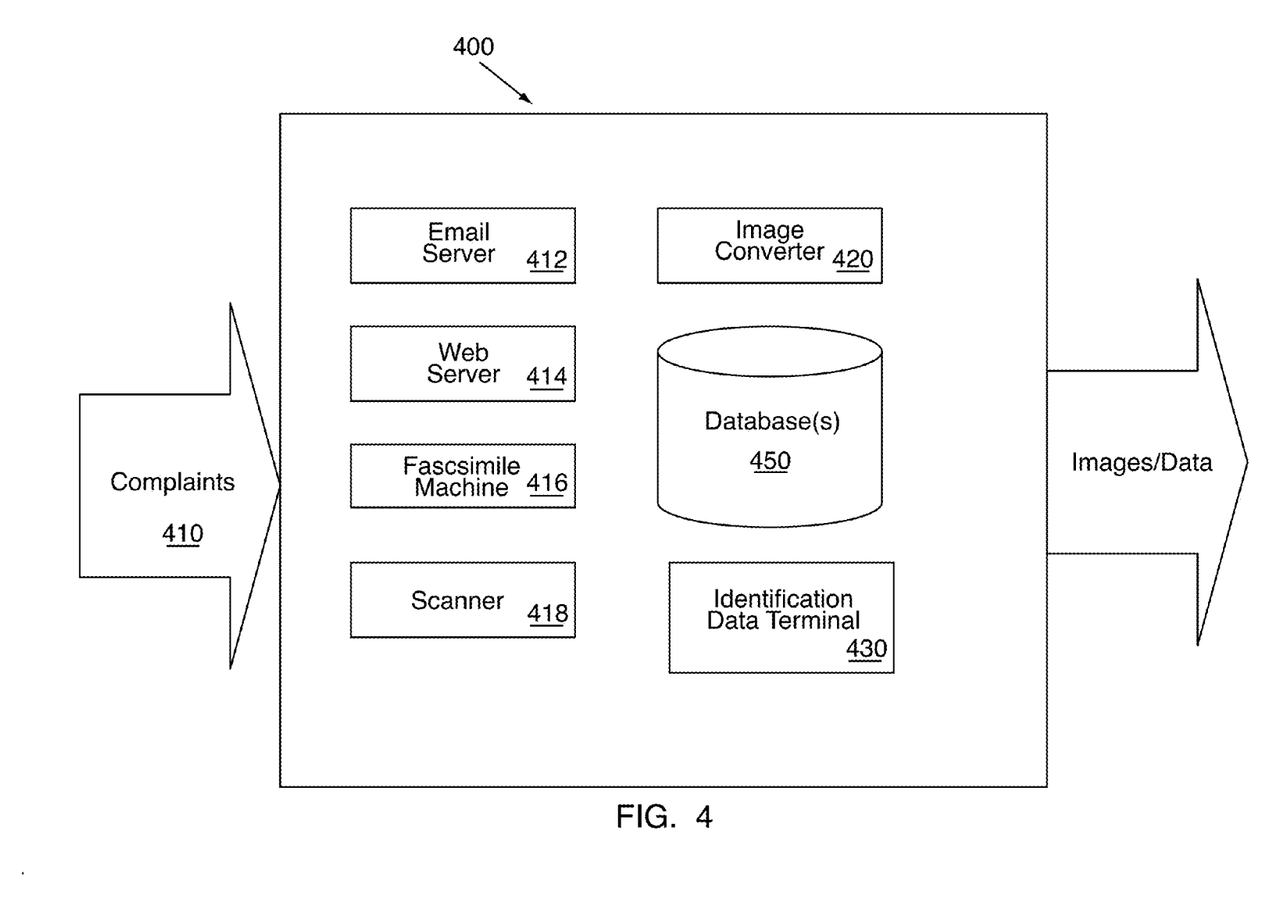
FIG. 4 is a block diagram of a complaint document conversion module in accordance with some embodiments of the invention.

FIG. 4 is a block diagram of a document conversion system 400 in accordance with some embodiments of the invention. As described with respect to FIG. 1, the document conversion system 400 may receive insurance complaint documents 410 from one or more submitters. For example, the document conversion system 400 might include an email server 412 to receive emails and attachments from submitters. Similarly, the document conversion system 400 may include a web server 414 to access web sites or links and/or to receive information submitted via a web site associated with the system 400. Document conversion system 400 may include a facsimile machine 416 to receive insurance complaint documents over the public switched telephone network or other communication network. According to some embodiments, the document conversion system 400 further includes one or more scanners 418 that can create electronic image files from paper documents.

According to some embodiments, the document conversion system 400 further includes an image converter 420. The image converter 420 might comprise, for example, an image format converter that translates data from a first image format to a second image format (e.g., a JPEG image to a bitmap image). The image converter 420 might also comprise, for example, an optical character recognition application that converts some or all of an image file into text information. Note that the image converter 420 might convert any type of document into any other type of document (e.g., a spreadsheet document might be converted to a word processing or HTML format).

The document conversion system 400 may further include one or more identification data terminals 430 for display and manipulation of one or more of the complaint documents, including assignment of identification data to the complaint documents.

The document conversion system 400 may further include one or more databases 450 to store the complaint related image information and associated identification data. Information from the databases 450 may then be transmitted to and/or accessed by other devices. For example, a scanned PDF image file in the database 450 (and a manually entered complainant name and address associated with that image file) might be transmitted to an automated policy validation engine.

Figure 5:
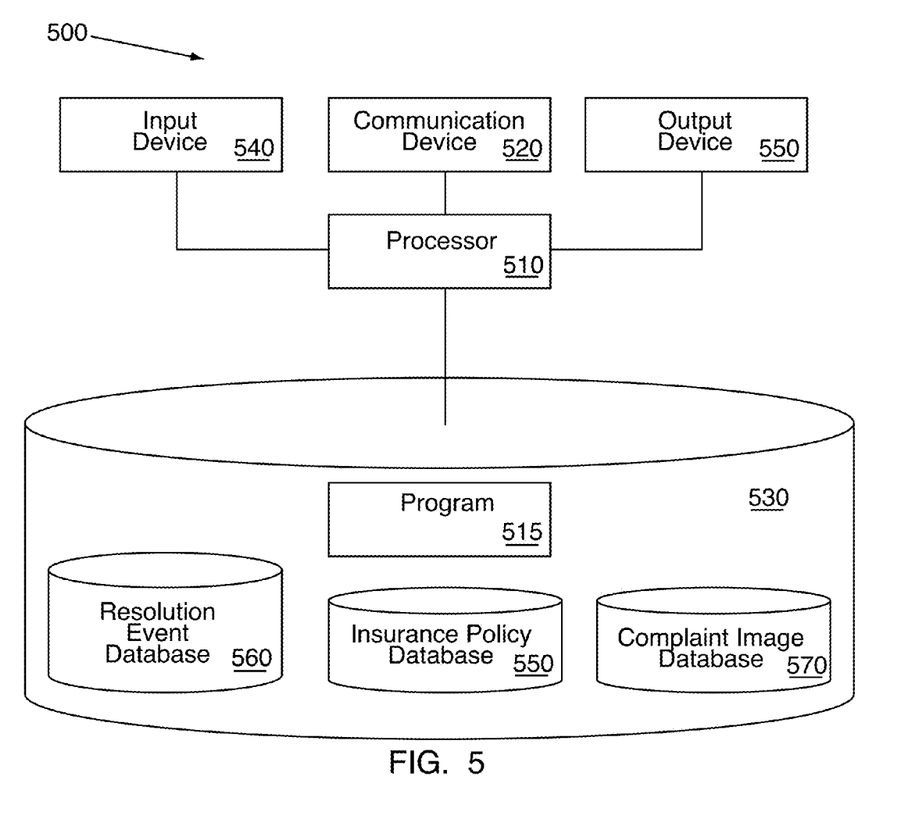
FIG. 5 illustrates an automated validation module in accordance with an exemplary embodiment of the invention.

FIG. 5 illustrates an automated policy validation module or engine 500 that might be descriptive, for example, of the policy validation module 130 illustrated in FIG. 1 in accordance with an exemplary embodiment of the invention. The policy validation module 500 intelligently matches a complaint document with an insurance policy number. The automated validation module 500 comprises a processor 510, such as one or more INTEL® Pentium® processors, coupled to a communication device 520 configured to communicate via a communication network (not shown in FIG. 5). The communication device 520 may be used to communicate, for example, with one or more remote complaint submitter devices, complaint document conversion systems, review systems, complaint processor devices and/or the respective Department of Insurance.

The processor 510 is also in communication with an input device 540. The input device 540 may comprise, for example, a keyboard, a mouse, or computer media reader. Such an input device 540 may be used, for example, to enter information about document images and/or validation rules. The processor 510 is also in communication with an output device 550. The output device 550 may comprise, for example, a display screen or printer. Such an output device 550 may be used, for example, to provide reports and/or display information associate with validation rules (e.g., indicating how often a particular rule resulted in an accurate insurance claim number prediction based on complaint information received).

The processor 510 is also in communication with a storage device 530. The storage device 530 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 530 stores a program 515 for controlling the processor 510. The processor 510 performs instructions of the program 515, and thereby operates in accordance any embodiments of the present invention described herein. For example, the processor 510 may receive, via the communication device 520, an insurance complaint document image and associated complaint document identification data. The processor 510 may also match the complaint document identification data with an insurance policy identifier or an insurance claim identifier. Moreover, the processor 510 may match this information using one or more techniques, rules or formulas. For example, matching the complaint document identification data with a policy number may be performed using deterministic, probabilistic, fuzzy, phonetic, and transliterative techniques, knowledge-based expertise and advanced heuristic algorithms and/or combinations thereof.

According to some embodiments, the processor 510 may transmit, via the communication device 520, an indication of the insurance complaint document image along with the insurance event or claim identifier for review and complaint resolution processing.

As used herein, information may be "received" by or "transmitted" to, for example: (i) the automated policy validation module 500 from submitter devices, document conversion systems, review systems, and/or complaint processor devices; or (ii) a software application or module within the automated validation engine 500 from another software application, module, or any other source.

As shown in FIG. 5, the storage device 530 also stores: an insurance policy database 560, a complaint resolution event database 570, and a complaint document image database 580. Insurance policy database 560 may store information about underlying policies related to the complaint. Complaint resolution event database 570 may store information about progress and/or resolution information related to each complaint. Complaint document image database 580 may store electronic representations of documents and images that relate to the complaints received. The illustrations and accompanying descriptions of the databases presented herein are exemplary, and any number of other database arrangements could be employed besides those suggested by the figures.

Figure 6:
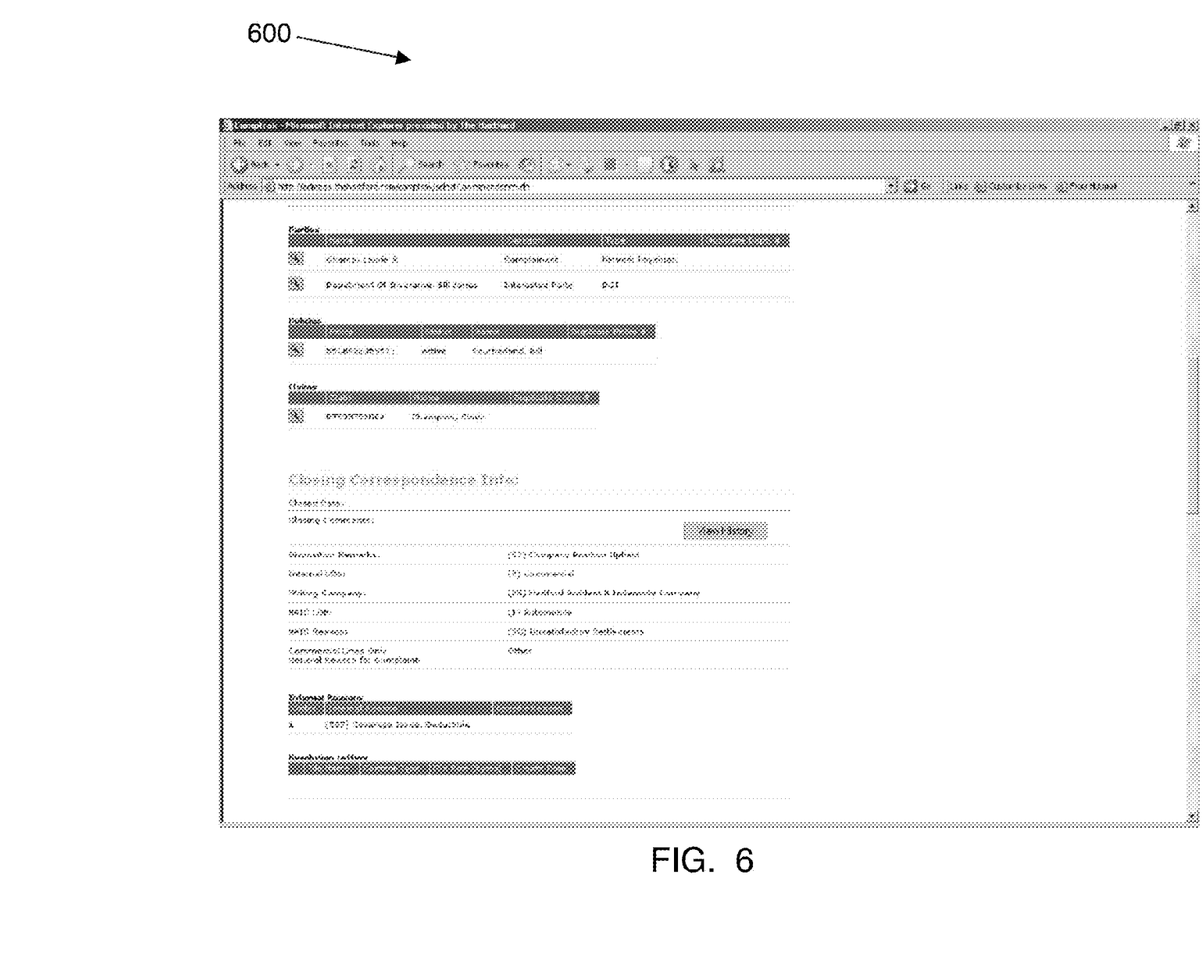
FIG. 6 illustrates a graphical user interface display in accordance with an exemplary embodiment of the present invention.

FIG. 6 illustrates another graphical user interface display in accordance with an exemplary embodiment of the present invention. In particular, FIG. 6 illustrates a display 600 that might be used, for example, to access policy information about certain complaint document images and/or information about those images. A user may, according to some embodiments, adjust and/or enter additional information in display 600.

Figure 7:
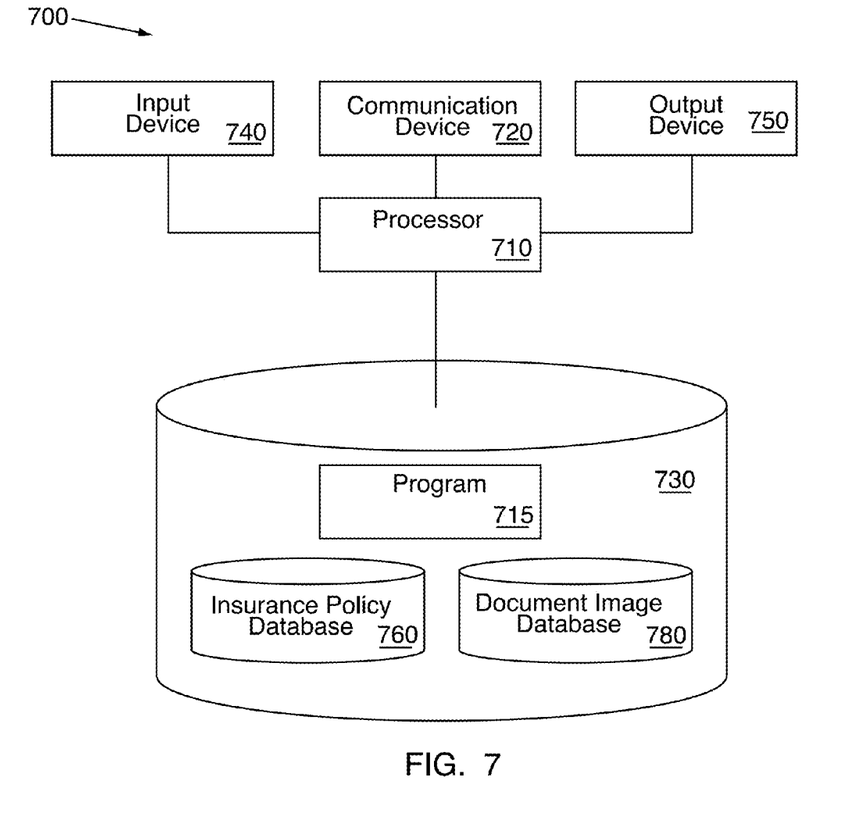
FIG. 7 is a block diagram of a complaint redundancy review module in accordance with some embodiments of the invention.

FIG. 7 illustrates an automated redundancy review module or engine 700 that might be descriptive, for example, of the redundancy review module 140 illustrated in FIG. 1 in accordance with an exemplary embodiment of the invention. The redundancy review module 700 comprises a processor 710, such as one or more INTEL® Pentium® processors, coupled to a communication device 720 configured to communicate via a communication network (not shown in FIG. 7). The communication device 720 may be used to communicate, for example, with one or more remote complaint submitter devices, complaint document conversion systems, review systems, complaint processor devices and respective Department of Insurance offices.

The processor 710 is also in communication with an input device 740. The input device 740 may comprise, for example, a keyboard, a mouse, or computer media reader. Such an input device 740 may be used, for example, to enter information about document images and/or validation rules. The processor 710 is also in communication with an output device 750. The output device 750 may comprise, for example, a display screen or printer. Such an output device 750 may be used, for example, to provide reports and/or display information associate with validation rules (e.g., indicating how often a particular rule resulted in an accurate insurance claim number prediction based on complaint information received).

The processor 710 is also in communication with a storage device 730. The storage device 730 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 730 stores a program 715 for controlling the processor 710. The processor 710 performs instructions of the program 715, and thereby operates in accordance any embodiments of the present invention described herein. For example, the processor 710 may receive, via the communication device 720, a policy identifier or policy number associated with an insurance complaint document image and associated complaint document identification data. The processor 710 may also resolve or match the policy number with various complaint documents to determine if two or more complaint documents may have been filed, by for example, a single complainant. Moreover, the processor 710 may match this information using one or more techniques, rules or formulas. For example, resolving may be performed using artificial intelligence techniques, Boolean searching, generic keyword and concept searching, full fuzzy matching on numerical values, ordinal criteria and textual criteria and bi-directional and asymmetrical matching. Additional other techniques may be performed using deterministic, probabilistic, fuzzy, phonetic, and transliterative techniques, knowledge-based expertise and advanced heuristic algorithms and/or combinations thereof. According to some embodiments, the processor 710 may transmit, via the communication device 720, an indication of the insurance policy number for review and complaint resolution processing, e.g. consolidating multiple complaints into a single file.

As shown in FIG. 7, the storage device 730 also stores: an insurance policy database 760 and a complaint document image database 780. Insurance policy database 760 may store information about underlying policies related to the complaint. Complaint document image database 780 may store electronic representations of documents and images that relate to the complaints received. The illustrations and accompanying descriptions of the databases presented herein are exemplary, and any number of other database arrangements could be employed besides those suggested by the figures. In this case, the redundancy determination may be performed using one or more business rules or predictive models to determine which complaint documents may relate to single insurance policy number. For example, intelligent matching algorithms may be employed to associate multiple complaints associated with a single policy number by matching complainant identification data, complaint subject matter and/or date related data, such as when the multiple complaints were submitted.

Figure 8:
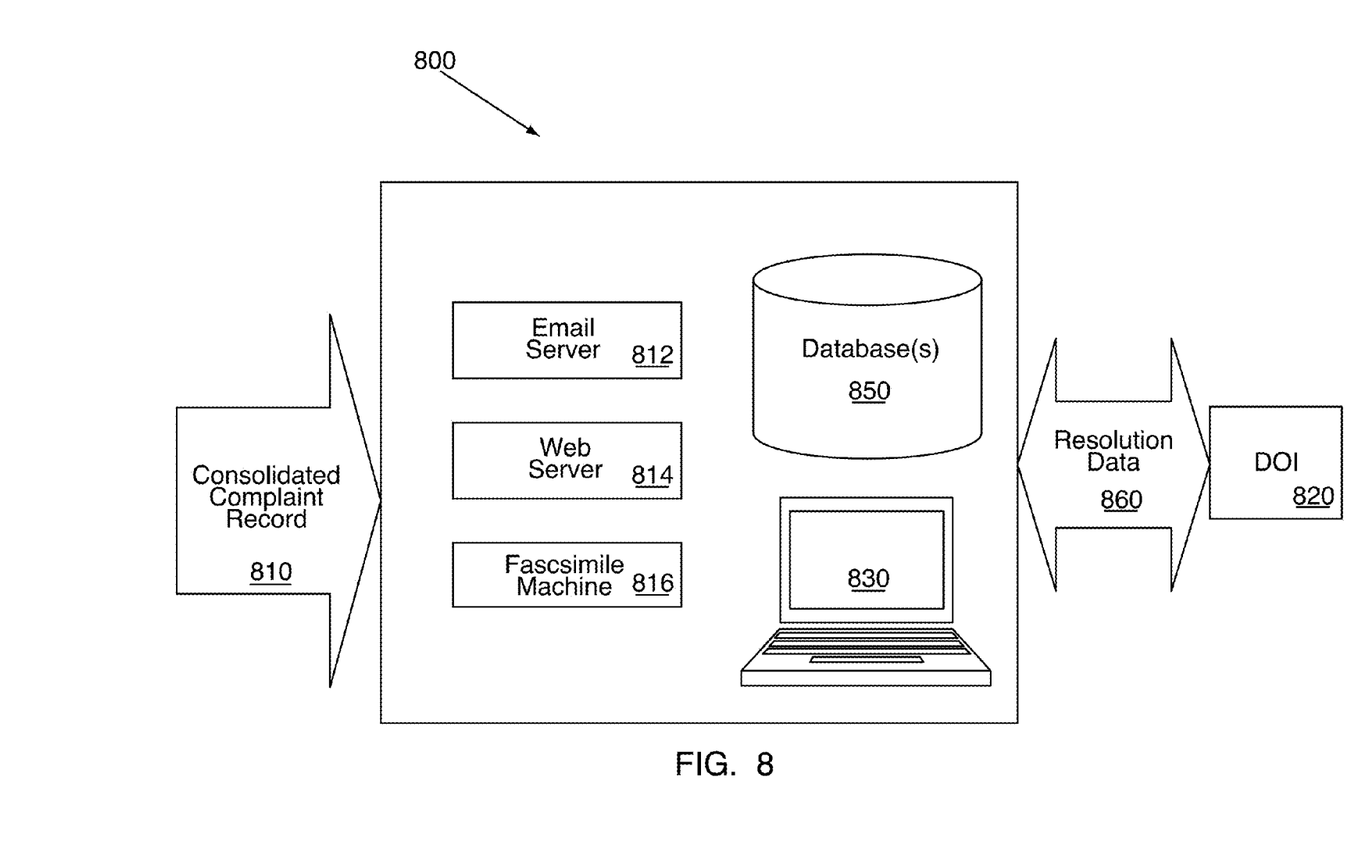
FIG. 8 is a block diagram of a complaint resolution processing module in accordance with some embodiments of the invention.

FIG. 8 is a block diagram of a complaint resolution processing module 800 in accordance with some embodiments of the invention, such as previously described with respect to module 160 in FIG. 1. As described with respect to FIG. 1, the resolution processing module 800 may receive consolidated complaint images or records 810 from a complaint redundancy review module, such as module 140 in FIG. 1. Complaint resolution processing module 800 might include an email server 812, a web server 814 a facsimile machine 816 to communicate with a Department of Insurance 820. According to some embodiments, the document conversion system 400 further includes one or more scanners 418 that can create electronic image files from paper documents.

Complaint resolution processing module 800 may further include one or more data terminals 830 for display and manipulation of one or more of the complaint documents and corresponding resolution documents. Complaint resolution processing module 800 may further include one or more databases 850 to store the complaint related resolution information and associated Department of Insurance information and guidelines. For example, Department of Insurance guidelines may include time frames and deadlines for complaint resolution as well as specifying response guidelines and resolution guidelines for the insurance company, which may be transmitted between complaint resolution processing module 800 and the Department of Insurance as resolution related data 860.

Figure 9:
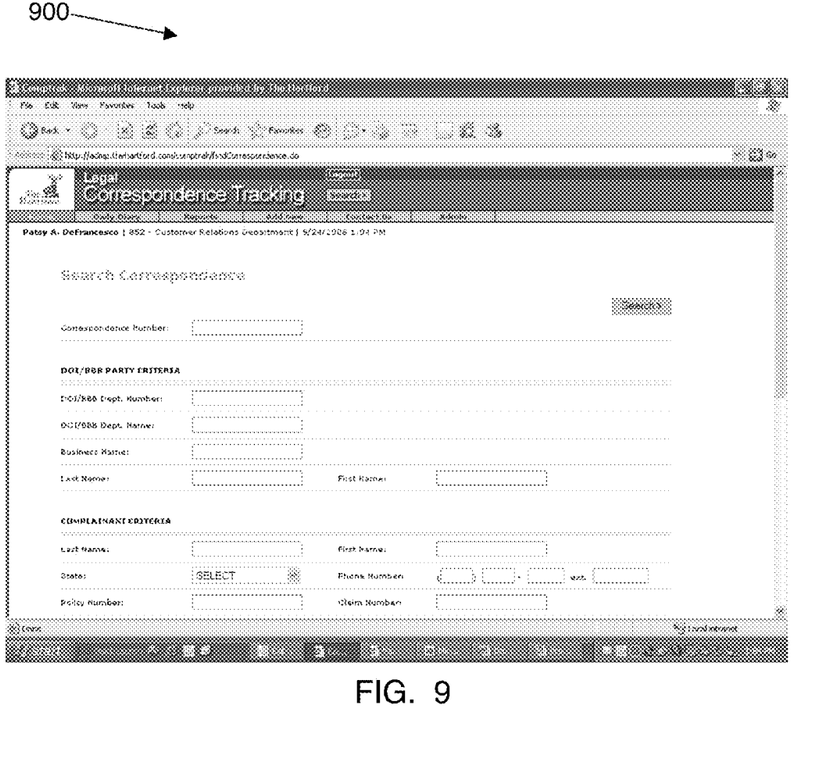
FIG. 9 illustrates a graphical user interface display in accordance with an exemplary embodiment of the present invention.

The present inventive system also provides robust search and reporting capabilities, which greatly expedite the complaint resolution process. FIG. 9 illustrates a display 900 that might be used to "search" for complaint related correspondence in one or more document images based on certain Department of Insurance (DOI) or complainant information.

Figure 10:
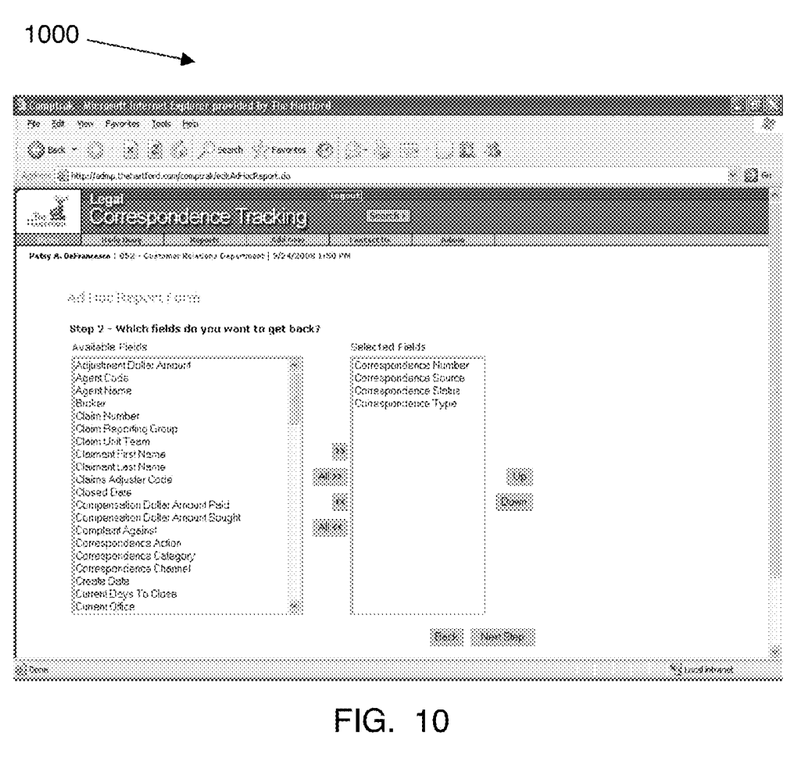
FIG. 10 illustrates a graphical user interface display in accordance with an exemplary embodiment of the present invention.

FIG. 10 illustrates a display 1000 that might be used to "report" on one or more complaints in the system. For example, a user may customize the report form to display or print complaint information in a user customizable format.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, not that any number of other configurations may be provided in accordance with embodiments of the present invention (e.g., some of the information associated with the databases described herein may be combined or stored in external systems). Moreover, although examples of specific types of claims involving automobile losses have been used, embodiments of the present invention could be used with other types of claims.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. An integrated insurance complaint document management and processing system for managing and processing regulatory agency complaints, comprising:
    a complaint document conversion system comprising:
        one or more of an email server, a web server, a facsimile machine and a scanner for receiving an insurance complaint document from a remote device,
        an image format converter for converting the received insurance complaint document to a specified document image format,
        one or more identification data terminals for assigning document identification data to the document image, and
        one or more databases for storing the document identification data;
    an automated validation module comprising a processor configured to:
        (i) receive the document image and document identification data from the document conversion system, and
        (ii) match the document image with insurance policy information from an insurance policy database; and
    a complaint redundancy module comprising a processor configured to:
        (i) receive the insurance policy information associated with the document image from the automated validation module,
        (ii) resolve for redundancies related to the insurance policy and
        (iii) consolidate redundancies related to the insurance policy.

2. The integrated insurance complaint document management and processing system of claim 1, wherein said image format converter comprises an optical character recognition application.

3. The integrated insurance complaint document management and processing system of claim 1 further comprising a complaint resolution module comprising a processor configured to receive claim complaint processing guidelines from the regulatory agency.

4. The integrated insurance complaint document management and processing system of claim 1, wherein the complaint redundancy module's processor is further configured to resolve redundancies using at least one of generic keyword and concept searching, full fuzzy matching on numerical values, Boolean searching, ordinal criteria and textual criteria and bi-directional and asymmetrical matching.

5. The integrated insurance complaint document management and processing system of claim 1, wherein the automated validation module's processor is further configured to validate the complaint document with an insurance policy identifier by using a combination of at least two of deterministic, probabilistic, fuzzy, phonetic, transliterative techniques, knowledge-based expertise and advanced heuristic algorithms.

6. The integrated insurance complaint document management and processing system of claim 1 further comprising a complaint resolution module comprising a processor configured to process a consolidated claim record for resolution.

7. The integrated insurance complaint document management and processing system of claim 1 further comprising a complaint resolution module comprising a processor configured to communicate complaint resolution information to the regulatory agency.

8. The integrated insurance complaint document management and processing system of claim 1, wherein the automated validation module's processor is further configured to validate the complaint document with an insurance policy identifier by mapping document correspondence identification data to a corresponding insurance policy number.

9. A computer implemented method for managing and processing regulatory agency complaints, the computer implemented method comprising:
    receiving, via a complaint document conversion system comprising one or more of an email server, a web server, a facsimile machine and a scanner, an insurance complaint document from a remote device;
    the complaint document conversion system converting the received insurance complaint document to a document image;
    the complaint document conversion system assigning document identification data to the document image;
    the complaint document conversion system storing the document identification data;
    receiving, via an automated validation engine comprising a processor, the document image and document identification data from the document conversion system;
    the automated validation engine matching the document image with insurance policy information from an insurance policy database;
    receiving, via a complaint redundancy engine comprising a processor, the insurance policy information associated with the document image from the automated validation engine;
    the complaint redundancy engine resolving for redundancies related to the insurance policy; and
    the complaint redundancy engine consolidating redundancies related to the insurance policy.

10. The computer implemented method of claim 9 further comprising receiving, via a complaint resolution module comprising a processor, claim complaint processing guidelines from the regulatory agency.

11. The computer implemented method of claim 9, wherein the complaint redundancy engine resolves redundancies using at least one of generic keyword and concept searching, full fuzzy matching on numerical values, Boolean searching, ordinal criteria and textual criteria and bi-directional and asymmetrical matching.

12. The computer implemented method of claim 9, wherein the automated validation engine validates the complaint document with an insurance policy identifier by using a combination of at least two of deterministic, probabilistic, fuzzy, phonetic, transliterative techniques, knowledge-based expertise and advanced heuristic algorithms.

13. The computer implemented method of claim 9, wherein the automated validation engine validates the complaint document by mapping document correspondence identification data to a corresponding insurance policy number.

14. The computer implemented method of claim 9 further comprising a complaint resolution module communicating complaint resolution information to the regulatory agency.

15. A non-transitory computer-readable medium encoded with instructions for configuring a computer processor to:
receive an insurance complaint document from a remote device;
convert the received insurance complaint document to a document image;
assign document identification data to the document image and store the document identification data in a database;
match the document image with insurance policy information from an insurance policy database;
resolve for redundancies related to the insurance policy; and
consolidate redundancies related to the insurance policy.

16. The non-transitory computer-readable medium of claim 15 further encoded with instructions for configuring the processor to resolve for redundancies by using at least one of generic keyword and concept searching, full fuzzy matching on numerical values, Boolean searching, ordinal criteria and textual criteria and bi-directional and asymmetrical matching.

17. The non-transitory computer-readable medium of claim 15 further encoded with instructions for configuring the processor to validate the complaint document with an insurance policy identifier by using a combination of at least two of deterministic, probabilistic, fuzzy, phonetic, transliterative techniques, knowledge-based expertise and advanced heuristic algorithms.

18. The non-transitory computer-readable medium of claim 15 further encoded with instructions for configuring the processor to validate the complaint document with an insurance policy identifier by mapping document correspondence identification data to a corresponding insurance policy number.

19. The non-transitory computer-readable medium of claim 15 further encoded with instructions for configuring the processor to communicate complaint resolution information to the regulatory agency.

20. The non-transitory computer-readable medium of claim 15 further encoded with instructions for configuring the processor to receive claim complaint processing guidelines from the regulatory agency.

* * * * *